United States Patent
Lu et al.

(10) Patent No.: US 7,741,424 B2
(45) Date of Patent: Jun. 22, 2010

(54) PHOSPHORIC ESTER OF CELLULOSE DERIVATIVE AND METAL ADSORBENT COMPRISING THE SAME

(75) Inventors: Ming Lu, Tsukuba (JP); Katsumi Yabusaki, Tsukuba (JP)

(73) Assignee: Kowa Co., Ltd., Nagoya-shi (JP)

( * ) Notice: Subject to any disclaimer, the term of this patent is extended or adjusted under 35 U.S.C. 154(b) by 474 days.

(21) Appl. No.: 11/575,098

(22) PCT Filed: Sep. 26, 2005

(86) PCT No.: PCT/JP2005/017605

§ 371 (c)(1),
(2), (4) Date: Mar. 12, 2007

(87) PCT Pub. No.: WO2006/035696

PCT Pub. Date: Apr. 6, 2006

(65) Prior Publication Data

US 2007/0217974 A1    Sep. 20, 2007

Related U.S. Application Data

(60) Provisional application No. 60/613,705, filed on Sep. 29, 2004.

(51) Int. Cl.
C08G 79/00 (2006.01)
B01D 11/04 (2006.01)
C08B 3/00 (2006.01)
C08B 5/00 (2006.01)
C08B 7/00 (2006.01)
C08B 13/00 (2006.01)

(52) U.S. Cl. .......................... 527/310; 536/62; 422/255

(58) Field of Classification Search .................. 527/310, 527/103; 536/62; 422/255
See application file for complete search history.

(56) References Cited

U.S. PATENT DOCUMENTS 2,008,986 A * 7/1935 Malm et al. .................. 536/62

(Continued)

FOREIGN PATENT DOCUMENTS

JP    50 130884    10/1975

(Continued)

OTHER PUBLICATIONS

Li et al., Analytica Chimica Acta 464, 2002, p. 331-339.*

(Continued)

*Primary Examiner*—Mark Eashoo
*Assistant Examiner*—Liam J Heincer
(74) *Attorney, Agent, or Firm*—Oblon, Spivak, McClelland, Maier & Neustadt, L.L.P.

(57) ABSTRACT

The present invention is directed to a phosphoric ester of 2,3-dihydroxypropyl cellulose or 3-(2,3-dihydroxypropoxy)-2-hydroxypropyl cellulose, the cellulose having optionally undergone partial carbamidation, and to a metal absorbent employing the ester, and to a metal-absorbing apparatus employing the metal adsorbent.

The cellulose derivative phosphoric ester serves as a metal adsorbent which exhibits high metal adsorption performance and metal adsorption rate per unit weight; has high mechanical strength; effectively soften water or a similar liquid; removes heavy metals from wastewater or a similar liquid at remarkably high efficiency; has excellent processability and can be formed into a variety of shapes and thus is applicable within a wide range; and can readily be reutilized.

19 Claims, 6 Drawing Sheets

U.S. PATENT DOCUMENTS

| | | | | |
|---|---|---|---|---|
| 2,759,924 | A * | 8/1956 | Touey | 536/62 |
| 2,981,730 | A * | 4/1961 | Martin et al. | 536/62 |
| 3,553,194 | A * | 1/1971 | Verbanae et al. | 536/108 |
| 3,574,719 | A * | 4/1971 | Chance et al. | 562/23 |
| 3,739,782 | A * | 6/1973 | Bernardin | 604/375 |
| 3,920,391 | A * | 11/1975 | Vigo et al. | 8/188 |
| 3,936,441 | A * | 2/1976 | Holst et al. | 536/44 |
| 3,962,212 | A * | 6/1976 | Sano et al. | 536/62 |
| 4,001,210 | A * | 1/1977 | Engelskirchen et al. | 536/84 |
| 4,013,821 | A * | 3/1977 | Engelskirchen et al. | 536/88 |
| 4,083,904 | A * | 4/1978 | Sano et al. | 264/41 |
| 4,096,326 | A * | 6/1978 | Reid | 536/95 |
| 4,256,111 | A * | 3/1981 | Lassen | 604/368 |
| 4,379,918 | A * | 4/1983 | Brandt et al. | 536/62 |
| 4,396,433 | A * | 8/1983 | Brandt et al. | 106/175.1 |
| 4,413,121 | A * | 11/1983 | Brandt et al. | 536/44 |
| 4,523,010 | A * | 6/1985 | Lukach et al. | 536/91 |
| 4,537,958 | A * | 8/1985 | Strange et al. | 536/85 |
| 4,553,601 | A * | 11/1985 | Almond et al. | 166/308.5 |
| 4,579,942 | A * | 4/1986 | Brode et al. | 536/84 |
| 5,067,565 | A * | 11/1991 | Holtmyer et al. | 166/305.1 |
| 5,122,549 | A * | 6/1992 | Holtmyer et al. | 523/130 |
| 5,182,380 | A * | 1/1993 | Breckwoldt et al. | 536/90 |
| 5,224,546 | A * | 7/1993 | Smith et al. | 166/300 |
| 5,304,620 | A * | 4/1994 | Holtmyer et al. | 527/310 |
| 5,358,561 | A * | 10/1994 | Kiesewetter et al. | 106/805 |
| 5,385,607 | A * | 1/1995 | Kiesewetter et al. | 106/172.1 |
| 5,463,037 | A * | 10/1995 | Kiyose et al. | 536/90 |
| 5,571,392 | A * | 11/1996 | Sato et al. | 204/296 |
| 5,698,265 | A * | 12/1997 | Mucalo et al. | 427/333 |
| 5,760,809 | A * | 6/1998 | Malhotra et al. | 347/105 |
| 5,789,204 | A * | 8/1998 | Kogtev et al. | 435/85 |
| 6,579,977 | B1 * | 6/2003 | Pieschel et al. | 536/30 |
| 6,761,272 | B1 * | 7/2004 | Pieschel et al. | 210/504 |
| 6,949,317 | B2 * | 9/2005 | Yoshida et al. | 429/303 |
| 2001/0007027 | A1 * | 7/2001 | Engelhardt et al. | 536/36 |
| 2002/0102464 | A1 * | 8/2002 | Yoshida et al. | 429/300 |
| 2003/0003359 | A1 * | 1/2003 | Banno et al. | 429/189 |
| 2004/0072332 | A1 * | 4/2004 | Suzuki et al. | 435/262 |
| 2004/0082744 | A1 * | 4/2004 | Klipper et al. | 526/218.1 |
| 2004/0139587 | A1 * | 7/2004 | Sato et al. | 29/25.03 |
| 2007/0093654 | A1 | 4/2007 | Yabusaki | |

FOREIGN PATENT DOCUMENTS

| | | |
|---|---|---|
| JP | 07 145201 | 6/1995 |
| JP | 9 108568 | 4/1997 |
| JP | 2003 500199 | 1/2003 |

OTHER PUBLICATIONS

P. de Magalhaes Padilha et al., Talanta 45, 1997, p. 317-323.*
Petreus et al., Chem. Bull. Politehnica Univ. Timisoara 48(62) 2003, p. 1-2.*

* cited by examiner

Compound 1: Cellulose phosphoric ester
Compound 2: 2,3-Dihydroxypropyl cellulose phosphoric ester

PHOSPHORIC ESTER OF CELLULOSE DERIVATIVE AND METAL ADSORBENT COMPRISING THE SAME

CROSS REFERENCE TO RELATED APPLICATION

This application is a 371 of PCT/JP05/017605, filed on Sep. 26, 2005, which claims the benefit of U.S. Provisional Application 60/613,705, filed on Sep. 29, 2004.

TECHNICAL FIELD

The present invention relates to a cellulose derivative phosphoric ester which effectively adsorbs metal ions present in a solution, to a method for producing the ester to a metal adsorbent employing the ester, and to a metal-adsorbing apparatus employing the metal adsorbent.

BACKGROUND ART

Currently known metal adsorbents include a material having a functional group which adsorbs metal ions and which is chemically bonded to a carrier and a low-molecular-weight compound having such a functional group, which compound is enclosed by a carrier so as to prevent elution of the compound. Examples of such metal-adsorbing functional groups include a carboxyl group, a sulfonate group an amino group, an imino group, a thiol group, and a phosphoric group. Such metal-adsorbing functional groups exhibit preference to metal species which are readily adsorbed. For example, the sulfonate group predominantly adsorbs monovalent metal ions such as potassium and sodium, whereas the carboxyl group and the phosphoric group can adsorb a wide variety of metal ions, including calcium and magnesium. The amino, imino, and thiol groups are reported to adsorb heavy metal ions well. Thus, the metal-adsorbing functional group is appropriately selected in consideration of a target metal species to be adsorbed. Regarding the carrier, a variety of species are employed, and examples include vinyl resins such as styrene resin and acrylic resin, and natural materials such as cellulose (powder, fiber, and gel), chitin, chitosan, and wool. In a typical production process of metal adsorbents, a metal-adsorbing functional group is introduced into a polymerizable monomer, and then the monomer is polymerized, from the viewpoint of easiness of synthesis and uniformity of the products. The thus-produced polymers are known to be ion-exchange resin and chelate resin. In another production process, a metal-adsorbing functional group is chemically introduced into a natural material such as cellulose or wool from the viewpoint of low material and production costs.

Meanwhile, metal adsorption performance of metal adsorbents varies depending not only on the chemical structure of the material that constitutes the adsorbents but on the product form thereof also. Generally, resin-based materials are molded into beads by virtue of the moldability thereof. However, such beads products have problems in relation to water treatment efficiency in that a large number of functional groups are confined inside the beads; that rates of diffusion of metal ions and a regenerating agent into the resin decrease due to the hydrophobicity of resin; and that the minimum adsorption level increases.

The mode of employing a metal adsorbent is also limited by its product form. For example, in the case of removal of metals contained in water, a metal adsorbent which is produced through graft polymerization of a resin material or a material chopped into small pieces with a metal-adsorbing functional group can be employed by feeding the metal adsorbent into water so as to adsorb metals and recovering the metal adsorbent through centrifugation or filtration. Alternatively, the above metal adsorbent is employed in a column. When the particle size of the above metal adsorbent is small, high-speed and high-efficiency filtration is impeded, which is not suited for treatment of a large amount of water.

When treatment for removing or recovering metals, particularly softening of water, removal of hazardous metals from industrial wastewater, removal of hazardous metals from polluted soil, or recovery of useful metals, is performed, the volume- and the area-to-be-treated becomes large, and thus a large amount of metal adsorbent is required Thus, preferably, the metal adsorbent for the above uses exhibits high adsorption performance and is inexpensive and regenerative The phosphoric group, serving as a metal-adsorbing functional group, has the following characteristic features: 1) one single phosphoric group can adsorb a divalent metal ion, thereby attaining high metal adsorption performance, 2) the phosphoric group readily releases a hydrogen ion in an acidic pH region, whereby metals contained in a solution can be adsorbed within a wide pH range; and 3) the minimum metal ion adsorption level is low. Cellulose, serving as a carrier, has the following characteristic features: 1) the fibrous structure of cellulose provides high rigidity; 2) a large number of functional groups are exposed to the fiber surface; and 3) high processability.

In consideration of the above characteristic features, metal adsorbents including a carrier made of natural material and a phosphoric ester group have drawn attention. Hitherto, there have been known such products and techniques in relation thereto including cellulose phosphoric ester for use in removal of heavy metals and radioactive metals (Patent Document 1); cellulose phosphoric ester having high mechanical strength produced by employing sulfur powder in the production of the ester (Patent Document 2): phosphoric, acetic, or benzoic esters of cellulose and starch for use in removal of heavy metals from water (Patent Document 3), and a filter made of cellulose having a carbamide group and a phosphoric ester group for use in removal of hardening components and heavy metals from drinking water (Patent Documents 3 and 4) However, these products are not satisfactory in terms of metal adsorption performance and economy. Therefore, keen demand has arisen for a low-cost metal adsorbent which exhibits higher metal adsorption performance, higher rate of reaction with metals, higher mechanical strength, higher processability, higher adaptability, higher reusability, etc.

Patent Document 1: Russian Patent No. 2096082 C1
Patent Document 2: WO 99/28372
Patent Document 3: German Patent Application Laid-Open No. 19859746 A
Patent Document 4: Japanese kohyo Patent Publication No. 2003-500199

DISCLOSURE OF THE INVENTION

Problems to be Solved by the Invention

An object of the present invention is to provide a metal-adsorbing compound which exhibits high adsorption performance and high adsorption rate with respect to metal ions present in a solution, high mechanical strength, high processability, wide adaptability, and excellent reusability. Another object of the invention is to provide a method for producing the ester. Still another object of the invention is to provide a metal adsorbent employing the ester. Yet another object of the invention is to provide a metal-adsorbing apparatus employing the metal adsorbent.

Means for Solving the Problems

The present inventors have carried out extensive studies in order to attain the aforementioned objects, and have found that a novel phosphoric ester of 2,3-dihydroxypropyl cellulose or a phosphoric ester 3-(2,3-dihydroxypropoxy)-2-hydroxypropyl cellulose, which is produced from 2,3-dihydroxypropyl cellulose or 3-(2,3-dihydroxypropoxy)-2-hydroxypropyl cellulose serving as a starting material, exhibits higher adsorption performance as compared with known cellulose phosphoric esters; is excellent in terms of adsorption rate, mechanical strength, and processability; has wide-range applicability; is reutilizable; has excellent anti-bacterial property; and provides high-viscosity liquid when admixed with water. The present invention has been accomplished on the basis of this finding.

Accordingly, the present invention provides a phosphoric ester compound of 2,3-dihydroxypropyl cellulose or 3-2,3-dihydroxypropoxy)-2-hydroxypropyl cellulose, the cellulose having optionally undergone partial carbamidation.

The present invention also provides a method for producing a phosphoric ester of 2,3-dihydroxypropyl cellulose or 3-(2,3-dihydroxypropoxy)-2-hydroxypropyl cellulose, the cellulose having optionally undergone partial carbamidation, characterized in that the method comprises reacting 2,3-dihydroxypropyl cellulose or 3-2,3-dihydroxypropoxy)-2-hydroxypropyl cellulose, the cellulose having optionally undergone partial carbamidation with a phosphorus oxide, a phosphoryl halide, a phosphoric acid or a salt of the acid.

The present invention also provides a metal adsorbent comprising a phosphoric ester of 2,3-dihydroxypropyl cellulose or 3-(2,3-dihydroxypropoxy)-2-hydroxypropyl cellulose, the cellulose having optionally undergone partial carbamidation, and a metal-adsorbing apparatus characterized by employing the metal adsorbent.

Effects of the Invention

The phosphoric ester of the present invention of 2,3-dihydroxypropyl cellulose or 3-(2,3-dihydroxypropoxy)-2-hydroxypropyl cellulose the cellulose having optionally undergone partial carbamidation, serves as a metal adsorbent which exhibits high metal adsorption performance and high metal adsorption rate per unit weight. The cellulose phosphoric ester has high mechanical strength, effectively softens water or a similar liquid, and removes heavy metals from wastewater or a similar liquid at remarkably high efficiency. The phosphoric ester has excellent processability and can be formed into a variety of shapes. Thus, the ester is applicable within a wide range, and can be readily reutilized. In addition, the ester has excellent anti-bacterial property and provides high-viscosity liquid when admixed with water.

BEST MODE FOR CARRYING OUT THE INVENTION

The cellulose derivative phosphoric ester of the present invention is a phosphoric ester of 2,3-dihydroxypropyl cellulose or 3-(2,3-dihydroxypropoxy)-2-hydroxypropyl cellulose the cellulose having optionally undergone partial carbamidation (i.e. having an aminomethanoic ester structure).

The phosphoric ester of the present invention of 2,3-dihydroxypropyl cellulose or 3-(2,3-dihydroxypropoxy)-2-hydroxypropyl cellulose, the cellulose having optionally undergone partial carbamidation (hereinafter the ester may be referred to as the cellulose derivative phosphoric ester of the present invention) is produced by reacting 2,3-dihydroxypropyl cellulose or 3-(2,3-dihydroxypropoxy)-2-hydroxypropyl cellulose, the cellulose having optionally undergone partial carbamidation, with a phosphorus oxide, a phosphoryl halide, a phosphoric acid, a salt of the acid, or a combination thereof.

2,3-Dihydroxypropyl cellulose, employed as a starting material of the present invention, may be produced through a method disclosed in U.S. Pat. Nos. 4,001,210 or 4,096,326, or other documents. 3-(2,3-Dihydroxypropoxy)-2-hydroxypropyl cellulose may be produced through reacting 2,3-dihydroxypropyl cellulose with glycidol or 3-halo-1,2-propanediol in the presence of an alkali, or through reacting 2,3-dihydroxypropyl cellulose with an epihalohydrin to form a glycidyl ether species, followed by treatment with acid. Examples of the alkali employed in the production include sodium methoxide methanol solution; alkali metal hydroxides such as potassium hydroxide and sodium hydroxide; alkali metal carbonates such as sodium carbonate, sodium bicarbonate, and potassium carbonate; and alkanolamines such as triethanolamine. Of these, sodium methoxide methanol solution and alkali metal hydroxides are preferred. The alkali is preferably added in an amount of 0.0005 to 1 mol with respect to 1 g of 2,3-dihydroxypropyl cellulose, more preferably 0.002 to 0.3 mol. The above reaction is preferably carried out in an alkaline solution, and the aqueous alkaline solution preferably has a concentration of 0.5 to 10 mol/L, more preferably 2 to 10 mol/L. The reaction temperature is preferably −20 to 150° C., more preferably 4 to 130° C. The reaction time is preferably 0.1 to 50 hours more preferably 1 to 30 hours. Examples of the epihalohydrin include epichlorohydrin and epibromohydrin. Examples of the acid include perchloric acid, hydrochloric acid, and sulfuric acid.

The starting cellulose material for producing 2,3-dihydroxypropyl cellulose may be a variety of natural cellulose materials Examples of the natural cellulose materials include products obtained through processing of microcrystalline cellulose, cotton, wood pulp, kenaf, hemp, etc.; i.e., cellulose fiber, degreased cotton, cotton linter, cotton fiber, cotton knitted fabric, cotton woven fabric, filter paper, wood chips, and sawdust.

Examples of the phosphorus oxide and phosphoryl halide for forming a phosphoric ester of 2,3-dihydroxypropyl cellulose or 3-(2,3-dihydroxypropoxy)-2-hydroxypropyl cellulose include phosphorus trioxide, phosphorus tetroxide, phosphorus pentoxide, phosphorus oxychloride, and phosphorus oxybromide. Examples of the phosphoric acid include metaphosphoric acid, pyrophosphoric acid, orthophosphoric acid (hereinafter the three phosphoric acid species may be referred to simply as phosphoric acid), triphophoric acid, and tetraphosphoric acid. Examples of the phosphoric acid salt include ammonium salts, alkanolamine salts, and alkali metal salts. Specific examples include diammonium hydrogenphosphate, ammonium dihydrogenphosphate, potassium dihydrogenphosphate, dipotassium hydrogenphosphate, sodium dihydrogenphosphate, and disodium hydrogenphosphate. Among these phosphorus oxides, phosphoryl halides, phosphoric acids and salts thereof, phosphorus oxychloride, phosphoric acids, and diammonium hydrogenphosphate are preferred.

The ratio in amount of the phosphorus oxide, phosphoryl halide, phosphoric acid, or a salt of the phosphoric acid to 2,3-dihydroxypropyl cellulose or 3-(2,3-dihydroxypropoxy)-2-hydroxypropyl cellulose is preferably 0.0007 to 0.4 mol with respect to 1 g of 2,3-dihydroxypropyl cellulose or 3-(2,3-dihydroxypropoxy)-2-hydroxypropyl cellulose, more preferably 0.1 to 0.2 mol The reaction temperature is preferably 0 to 150° C., more preferably 50 to 100° C. The reaction time is preferably 0.5 to 10 hours, more preferably 2 to 6 hours When 2,3-dihydroxypropyl cellulose or 3-(2,3-dihydroxypropoxy)-2-hydroxypropyl cellulose is employed as a starting material and converted to a phosphoric ester, a phosphoric ester of 2,3-dihydroxypropyl cellulose or 3-(2,3-dihydroxypropoxy)-2-hydroxypropyl cellulose in the form of the aforementioned knitted fabric, woven fabric, etc. can be obtained.

The phosphoric ester of partially carbamidated 2,3-dihydroxypropyl cellulose or 3-(2,3-dihydroxypropoxy)-2-hydroxypropyl cellulose may be produced through phosphoric-esterification, under the same conditions as employed above, of partially carbamidated 2,3-dihydroxypropyl cellulose in which a portion of hydroxyl groups are carbamidated.

The partially carbamidated 2,3-dihydroxypropyl cellulose or 3-(2,3-dihydroxypropoxy)-2-hydroxypropyl cellulose may be produced through, for example, reacting urea with 2,3-dihydroxypropyl cellulose or 3-(2,3-dihydroxypropoxy)-2-hydroxypropyl cellulose. The phosphoric ester of partially carbamidated 2,3-dihydroxypropyl cellulose or 3-(2,3-dihydroxypropoxy)-2-hydroxypropyl cellulose may be produced through converting 2,3-dihydroxypropyl cellulose or 3-(2,3-dihydroxypropoxy)-2-hydroxypropyl cellulose to a corresponding phosphoric ester in the presence of urea. The amount of urea employed for carbamidation is preferably 0.005 to 0.3 mol with respect to 1 g of 2,3-dihydroxypropyl cellulose or 3-(2,3-dihydroxypropoxy)-2-hydroxypropyl cellulose, more preferably 0.02 to 0.15 mol.

After completion of reaction, generally, the product is washed with water and dried.

The cellulose derivative phosphoric ester of the present invention preferably has a percent phosphorylation of 8.0 to 15.7 wt. % as reduced to phosphorus content, particularly preferably 10.0 to 15.7 wt. %, in the case of a phosphoric ester of 2,3-dihydroxypropyl cellulose, which may partially be carbamidated. In the case of a phosphoric ester of 3-(2,3-dihydroxypropoxy)-2-hydroxypropyl cellulose, which may partially be carbamidated, the percent phosphorylation is preferably 2.0 to 17.4 wt. % as reduced to phosphorus content, particularly preferably 6.0 to 17.4 wt. %, from the viewpoint of suitable metal adsorption performance.

The cellulose derivative phosphoric ester of the present invention preferably has a percent carbamidation of 0 to 9.7 wt. % as reduced to nitrogen content, particularly preferably 0 to 8.0 wt. %.

The cellulose derivative phosphoric ester of the present invention, having a phosphate group serving as a metal-adsorbing functional group, exhibits more excellent metal adsorption performance than does a cation-exchange resin metal adsorbent having a carboxyl group or a sulfonate group serving as an adsorbing group. In other words, since the hydroxyl moiety of the carboxyl group, serving as a weakly acidic cation-exchange group dissociates within a pH range of the alkaline region to a weak acidic region, the hydroxyl moiety cannot capture metal ions present in an acidic solution. In addition, the sulfonate group predominantly adsorbs a salt of monovalent metal such as sodium or potassium and virtually does not adsorb divalent metal ions. Furthermore, since the cation-exchange group adsorbs a divalent metal ion by means of two functional groups, there arise problems such as 1) low adsorption rate, and 2) deterioration in adsorption per unit weight. Chelate resin metal adsorbents generally have two or more lone pairs of nitrogen atoms belonging to an amino group, an imino group, or other nitrogen-containing group. Therefore, such chelate resin metal adsorbents selectively adsorb heavy metal ions among divalent metal ions, and do not adsorb alkaline earth metals such as calcium and magnesium This is one advantage of chelate resin metal adsorbents, but such a property is a disadvantage in softening of water in which calcium and magnesium are to be removed. In contrast, the cellulose derivative phosphoric ester of the present invention, having a phosphate group serving as a metal-adsorbing group (i.e., two adjacent hydroxyl groups on one single functional group), allows adsorption of a divalent metal ion by means of one single functional group. Therefore, the cellulose ester of the present invention attains high adsorption rate. In addition, since the phosphate group releases hydrogen belonging to the functional group also in an acidic region, metal ions contained in an acidic solution can be removed. Since the cellulose ester of the present invention adsorbs any type of metals among monovalent alkali metals, divalent alkaline earth metals and transition metals softening of water, wastewater treatment for removing heavy metals, and composite treatment thereof can be realized.

As described in the Examples hereinbelow, surprisingly, the cellulose derivative phosphoric ester of the present invention exhibits more excellent metal adsorption performance, as compared with a cellulose phosphoric ester.

The cellulose derivative phosphoric ester of the present invention has excellent reusability. Thus, the cellulose derivative phosphoric ester of the invention is superior to cellulose phosphoric esters as a metal adsorbent (i.e., a material for adsorbing metals in an aqueous solution.) The cellulose derivative phosphoric ester of the present invention, derived from a naturally occurring cellulose as a starting material, can be formed into knitted fabric, woven fabric, non-woven fabric, small chips, powder, paper, thread, fiber, cotton fabric, etc. Therefore, the ester of the invention is suited for a metal adsorbent by virtue of having remarkably high processability. Metal adsorption performance of metal adsorbents considerably varies depending on the shape of the adsorbents. Thus, the metal adsorbent is preferably in the form of powder, knitted fabric, woven fabric, non-woven fabric, paper, thread, fiber, cotton fabric, or a like shape. For example, when 2,3-dihydroxypropyl cellulose or 3-(2,3-dihydroxypropoxy)-2-hydroxypropyl cellulose, which is provided using knitted fabric or woven fabric as a starting material, is phosphorylated, phosphate groups are selectively provided on the surfaces of fiber filaments. In this case, factors affecting adsorption performance, such as particle size and moisture-permeability of cation-exchange resin beads, can be eliminated, which is preferred. In another aspect, the cellulose ester of the present invention allows liquid to pass through the space of the network structure, adsorbs metals through contact with phosphate groups present on the surfaces of fiber filaments, and has mechanical strength particularly at crossings of the fiber filaments in the network structure. Therefore, the cellulose ester can also be employed in pressurized water treatment for high-speed filtration of liquid without breaking the material. Generally, in high-speed filtration of liquid, fiber diameter of such material or net size of knitted fabric or woven fabric of the material is required to increase. When a phosphate group allowing rapid adsorption is selected as a metal-adsorbing group, and knitted fabric or woven fabric of 2,3-dihydroxypropyl cellulose or 3-(2,3-dihydroxypropoxy)-2-hydroxypropyl cellulose is employed as a support, chemical and physical high-speed water treatment can be performed.

As described above, the cellulose derivative phosphoric ester of the present invention exhibits excellent metal adsorption performance, reusability, processability to a variety of shapes, mechanical strength, and anti-bacterial property, and provides high-viscosity liquid when admixed with water. Thus, the ester of the invention is useful for a metal adsorbent of wide-range applicability.

Figure 4:
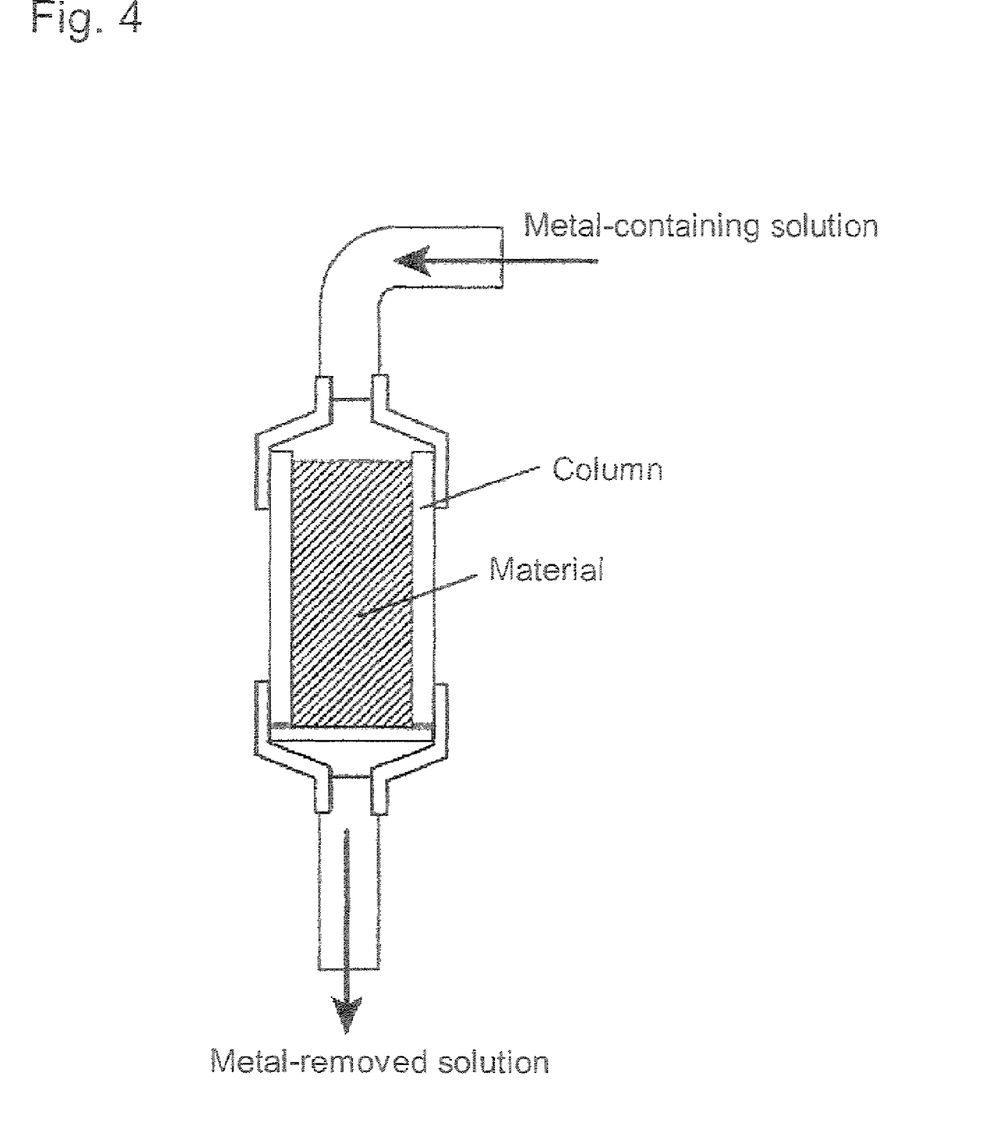
[FIG. 4] A sketch of a metal-adsorbing apparatus in which the metal adsorbent of the present invention is charged in a column.
Figure 5:
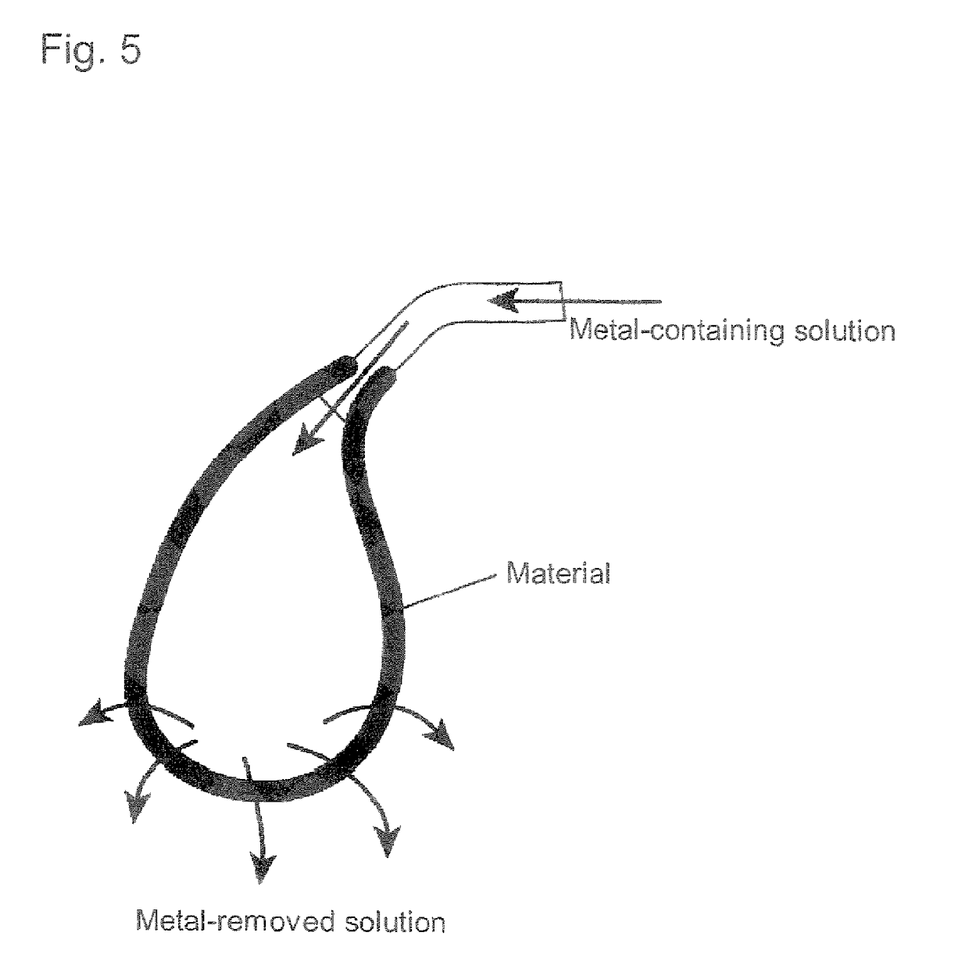
[FIG. 5] A sketch of a metal-adsorbing apparatus employing the metal adsorbent of the present invention in the form of a bag.
Figure 6:
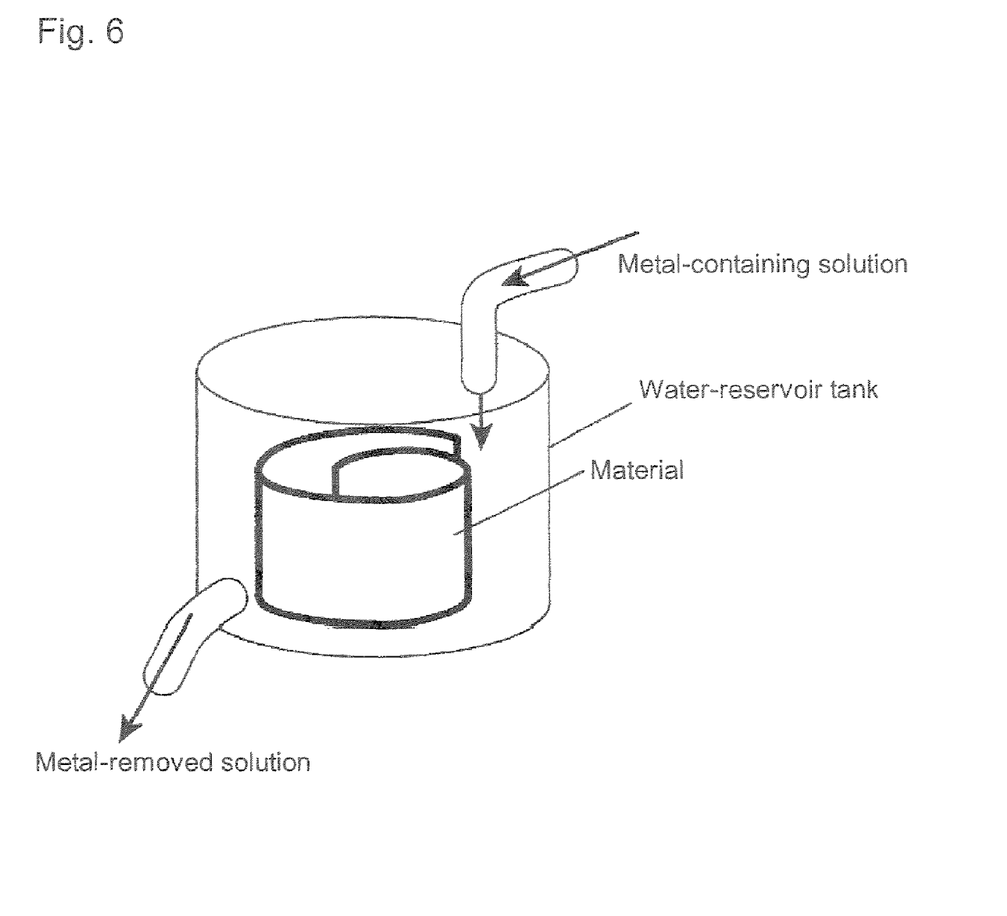
[FIG. 6] A sketch of a metal-adsorbing apparatus in which the metal adsorbent of present invention is placed in a water reservoir tank.

By virtue of exhibiting excellent metal adsorption performance, metal adsorbents (materials) containing the cellulose derivative phosphoric ester of the present invention can be installed in metal-absorbing apparatuses of a variety of shapes. Specific examples include a metal-adsorbing apparatus in which the metal adsorbent of the present invention is charged in a column (FIG. 4), a metal-adsorbing apparatus employing a metal-adsorbing bag made of the metal adsorbent of the present invention (FIG. 5) and a metal-adsorbing apparatus in which the metal adsorbent (in the form of tube of fabric) of present invention is placed in a water reservoir tank (FIG. 6).

EXAMPLES

The present invention will next be described in detail by way of examples, which should not construed as limiting the invention thereto.

Determination of Amount of Adsorbed Metal

Amount of metal adsorbed by each metal adsorbent was determined through the following procedure.

Specifically a metal adsorbent (W g), which had been minutely cut if required, was added to a 5-mmol/L aqueous solution (V L) containing metal species and sufficiently dispersed. The dispersion was stirred at room temperature (25° C.) for 24 hours, and an aliquot (0.5 mL) of the aqueous liquid was sampled in a 1.5-mL Eppendorf centrifugation tube. The sample was centrifuged at 12,000 r/min (rotor diameter: about 9 cm) for 10 minutes to thereby separate a supernatant from precipitated powder. The supernatant (X mL) was sampled, and diluted with 0.1-mol/L nitric acid (Y mL) at a dilution factor D [=(X+Y)/X]. Through atomic absorption spectroscopy and inductively coupled plasma atomic emission spectroscopy (ICP), metal concentration (C1) of the diluted solution was determined. In a similar manner, metal concentration (C0) of a similar aqueous solution but containing no metal adsorbent was determined. The amount of metal (Ad mmol/g) adsorbed by 1 g of a phosphoric ester compound of 2,3-dihydroxypropyl cellulose or 3-(2,3-dihydroxypropoxy)-2-hydroxypropyl cellulose was calculated through the following equation.

$$Ad = (C0 - C1) \times D \times V/W \quad \text{(Equation)}$$

Example 1

Production of 2,3-Epoxypropyl Cellulose

α-Cellulose (1.5 g) was added to dimethyl sulfoxide (90 mL) and was caused to swell at 60° C. for two hours. A 28-wt. % sodium methoxide methanol solution (60 mL) was added to the swelled cellulose whereby the cellulose was alkalinized at room temperature for two hours. Subsequently, the mixture was filtered, and the separated alkalinized cellulose was added to a mixture of dimethyl sulfoxide (100 mL) and 1-chloro-2,3-epoxypropane (200 mL), and the system was allowed to react at 50° C. for two hours. The formed matter was washed and dried, to thereby yield 2,3-epoxypropyl cellulose.

Example 2

Production of 2,3-Dihydroxypropyl Cellulose 2,3-Epoxypropyl cellulose (1 g) was added to water (20 mL), and perchloric acid was added to the mixture so as to adjust the pH to 2. Subsequently, the mixture was allowed to react at 50 to 60° C. for five hours for hydrolysis. The product was washed with water and dried, to thereby yield 2,3-dihydroxypropyl cellulose.

Example 3

Production of 2,3-Dihydroxypropyl Cellulose Phosphoric Ester (Through Phosphorylation by Use of Phosphoryl Chloride)

(1) Phosphoryl chloride (8 mL) was added to 2,3-dihydroxypropyl cellulose (1.0 g), and diammonium hydrogenphosphate (0.131 g, 0.001 mol) was further added. To the mixture, water (900 μL) was added dropwise with stirring. The mixture was heated at 70° C. for six hours, and the thus-formed intermediate was added to water (20 mL). The mixture was allowed to react at 50° C. for one hour for hydrolysis. The formed matter was washed with water and dried, to thereby yield 2,3-dihydroxypropyl cellulose phosphoric ester.

(2) The thus-produced 2,3-dihydroxypropyl cellulose phosphoric ester, cellulose phosphoric ester obtained by phosphorylating natural cellulose fiber (α-cellulose), and cellulose serving as a starting material were subjected to element analysis. The results are as follows:

2,3-Dihydroxypropyl cellulose phosphoric ester: C 26.42 wt. %, H 4.98 wt. %, and P 14.5 wt. %;

Cellulose phosphoric ester: C 37 50 wt. %, H 5.77 wt. %, and P 4.38 wt. %; and

Cellulose (α-cellulose): C 42.84 wt. % and H 6.45 wt. %.

Figure 1:
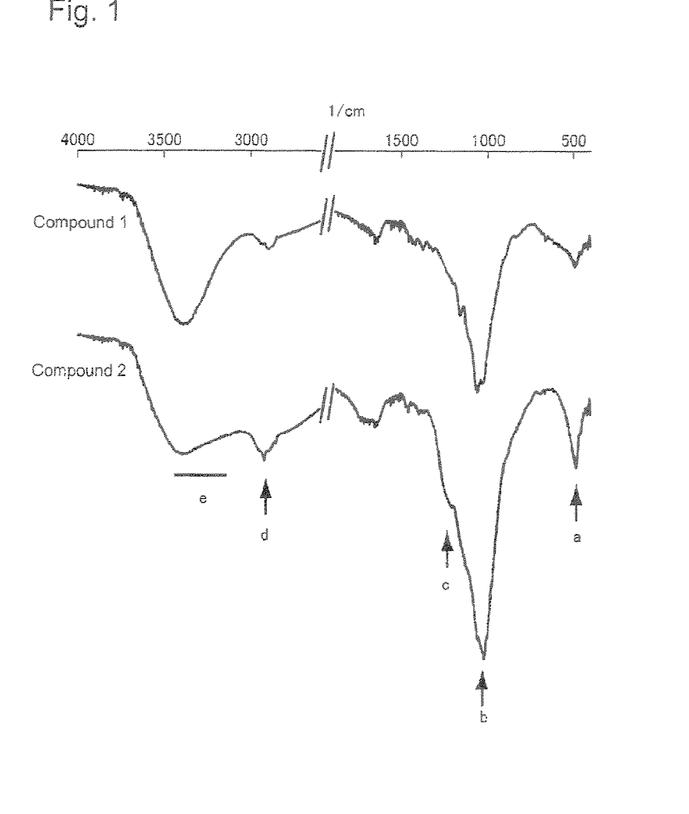
[FIG. 1] A chart of infrared absorption spectra of a cellulose phosphoric ester and a 2,3-dihydroxypropyl cellulose phosphoric ester.

(3) FIG. 1 shows infrared absorption spectra of the thus-obtained 2,3-dihydroxypropyl cellulose phosphoric ester and the cellulose phosphoric ester. As shown in FIG. 1, the 2,3-dihydroxypropyl cellulose phosphoric ester exhibits absorption peaks at 500 cm$^{-1}$ (a), 1,040 cm$^{-1}$ (b), 1,250 cm$^{-1}$ (c), 2,980 cm$^{-1}$ (d), and 3,200 to 3,450 cm$^{-1}$ (e), which clearly differ from the peaks attributed to the cellulose phosphoric ester.

(4) The amount of copper adsorbed by 2,3-dihydroxypropyl cellulose phosphoric ester was compared with the cases of cellulose phosphoric ester, chelate resin, and ion-exchange resin. The copper adsorption amount (hour 4) before reaching adsorption equilibrium and that (hour 24) after reaching adsorption equilibrium are shown in Table 1 (Solution pH: 5)

TABLE 1

| Material | (mmol/g) | |
|---|---|---|
| | Hour 4 | Hour 24 |
| 2,3-Dihydroxypropyl cellulose phosphoric ester | 2.03 | 2.19 |
| Cellulose phosphoric ester[1] | 1.01 | 1.07 |
| Chelate resin (CR-20)[2] | 1.26 | 1.76 |
| Ion-exchange resin (WK-40)[3] | 1.17 | 1.79 |
| Eporous[4] | 0.50 | 0.88 |

Note)
[1]Cellulose phosphoric ester produced through phosphorylation of natural cellulose powder (α-cellulose)
[2]Product of Mitsubishi Chemical Corporation
[3]Product of Mitsubishi Chemical Corporation
[4]Product of Miyoshi Oil & Fat Co., Ltd.

The 2,3-dihydroxypropyl cellulose phosphoric ester of the present invention exhibited high adsorption rate and excellent metal adsorption performance.

Figure 2:
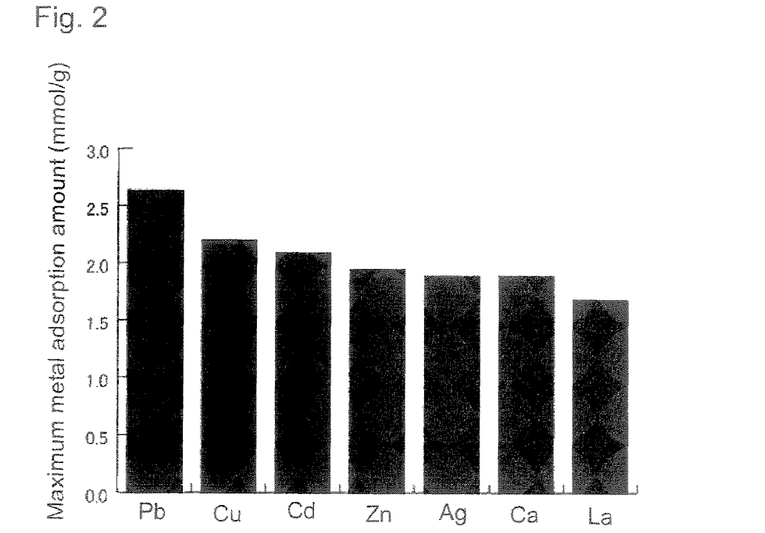
[FIG. 2] A graph showing adsorption performance of a 2,3-dihydroxypropyl cellulose phosphoric ester with respect to various metals within a DH range of 4 to 6.

(5) The amounts of various metals adsorbed by 2,3-dihydroxypropyl cellulose phosphoric ester were determined at pH of 4 to 6. FIG. 2 and Table 2 show the results.

The 2,3-dihydroxypropyl cellulose phosphoric ester exhibited excellent adsorption performance with respect to heavy metal ions and alkaline earth metal ions.

TABLE 2

| | Maximum adsorption amount (mmol/g) | | |
|---|---|---|---|
| Metal species | Cellulose phosphoric ester | 2,3-Dihydroxypropyl cellulose phosphoric ester | Initial pH |
| Heavy metal | | | |
| Cr | 1.09 | 1.96 | 3.07 |
| Ni | 0.99 | 1.84 | 6.10 |
| Zn | 1.09 | 1.94 | 5.95 |
| Cd | 1.16 | 2.08 | 5.65 |
| Pb | 1.05 | 2.63 | 5.02 |
| Alkaline earth metal | | | |
| Ca | 0.95 | 1.88 | 5.88 |
| Mg | 0.96 | 1.73 | 5.30 |

Figure 3:
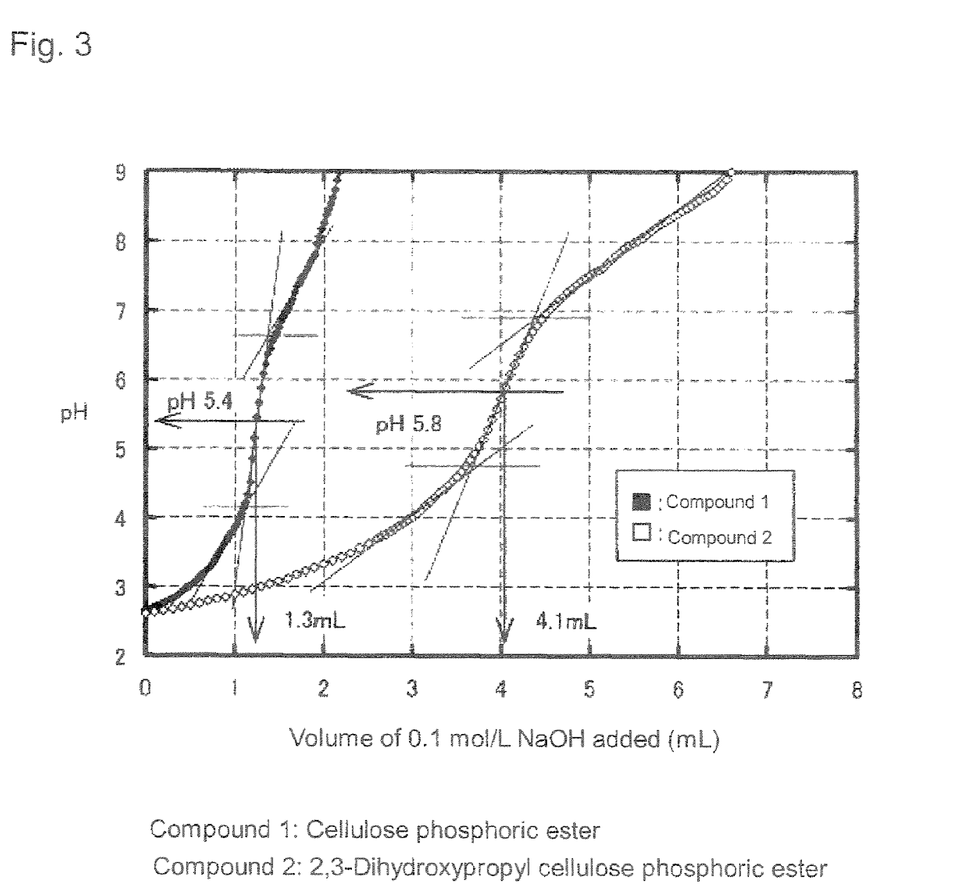
[FIG. 3] A graph showing titration curves of a 2,3-dihydroxypropyl cellulose phosphoric ester and a cellulose phosphoric ester.

(6) FIG. 3 shows titration curves of the produced cellulose phosphoric ester and 2,3-dihydroxypropyl cellulose phosphoric ester.

As compared with the cellulose phosphoric ester, 2,3-dihydroxypropyl cellulose phosphoric ester was found to have a large number of phosphoric ester groups per sugar unit.

Example 4

Production of 2,3-Dihydroxypropyl Cellulose Phosphoric Ester (by Use of Phosphorylation Reagent Containing Urea and Phosphoric Acid)

Phosphoric acid (0.015 mol), diammonium hydrogenphosphate (0.02 mol), and urea (0.1 mol) were dissolved in water (15.0 mL) to thereby prepare a phosphorylation agent liquid. The liquid was well mixed with 2,3-dihydroxypropyl cellulose (1 g), and the mixture was left to stand at room temperature (25° C.) for one hour. Subsequently, the mixture was thoroughly dried at 90° C. for six hours, and allowed to react at 150° C. for two hours. The reaction product was washed with water and dried at 70° C., to thereby produce a 2,3-dihydroxypropyl cellulose phosphoric ester (fiber form) The cellulose ester was found to have a phosphorus content of 10.25 wt. % and a nitrogen content of 5.74 wt. %, and to adsorb copper (pH: 5) in an amount of 2.03 mmol/g.

Example 5

Viscosity of Aqueous Solution

Each (0.05 g) of α-cellulose and 2,3-dihydroxypropyl-α-cellulose phosphoric ester was admixed with water (10 mL), and the kinematic viscosity of the liquid was determined by means of an Ostwald viscomreter. α-Cellulose and 2,3-dihydroxypropyl-α-cellulose phosphoric ester were found to have a kinematic viscosity of 1.07 and 1.20, respectively Although kinematic viscosity is a viscosity per weight, when these values are reduced to viscosity per amount of substance (mol), α-cellulose and 2,3-dihydroxypropyl cellulose phosphoric ester had a viscosity of 1.07 and 2.85, respectively, indicating remarkable increase in molar viscosity. Since 2,3-dihydroxypropyl-α-cellulose phosphoric ester material has a large number of hydroxyl groups, high viscosity can be provided.

Example 6

Anti-Bacterial Property 2,3-Dihydroxypropyl-α-cellulose phosphoric ester material (25 mg) was admixed with an NB medium (NUTRIENT BROTH, product of Kanto Chemical Co., Inc.) (5.0 mL) The thus-prepared medium was inoculated with each of the bacteria E. coli and Staphylococcus aureus). An anti-bacterial effect of the synthesized compound was determined through change in absorbance of the sample, as compared with the sample of α-cellulose (starting material for the compound) In the absorbance measurement, absorbance of as-prepared solution (1) obtained by admixing a material (α-cellulose or 2,3-dihydroxypropyl-α-cellulose phosphoric ester) with an NB medium is represented by A[M-0], and absorbance of as-prepared solution (2) obtained by admixing the material with a bacterium-containing NB medium is represented by A[MB-0]. Absorbance of solution (1) after maintenance at 37° C. for 16 hours is represented by A[M-16], and absorbance of solution (2) after culturing at 37° C. for 16 hours is represented by A[MB-16]. Thus, an increase in absorbance ΔA due to the growth of the bacterium for 16 hours is given by the following relationship.

$$\Delta A = A[MB\text{-}16] - A[MB\text{-}0] - A[M\text{-}16] + A[M\text{-}0]$$ (formula)

Figure 7:
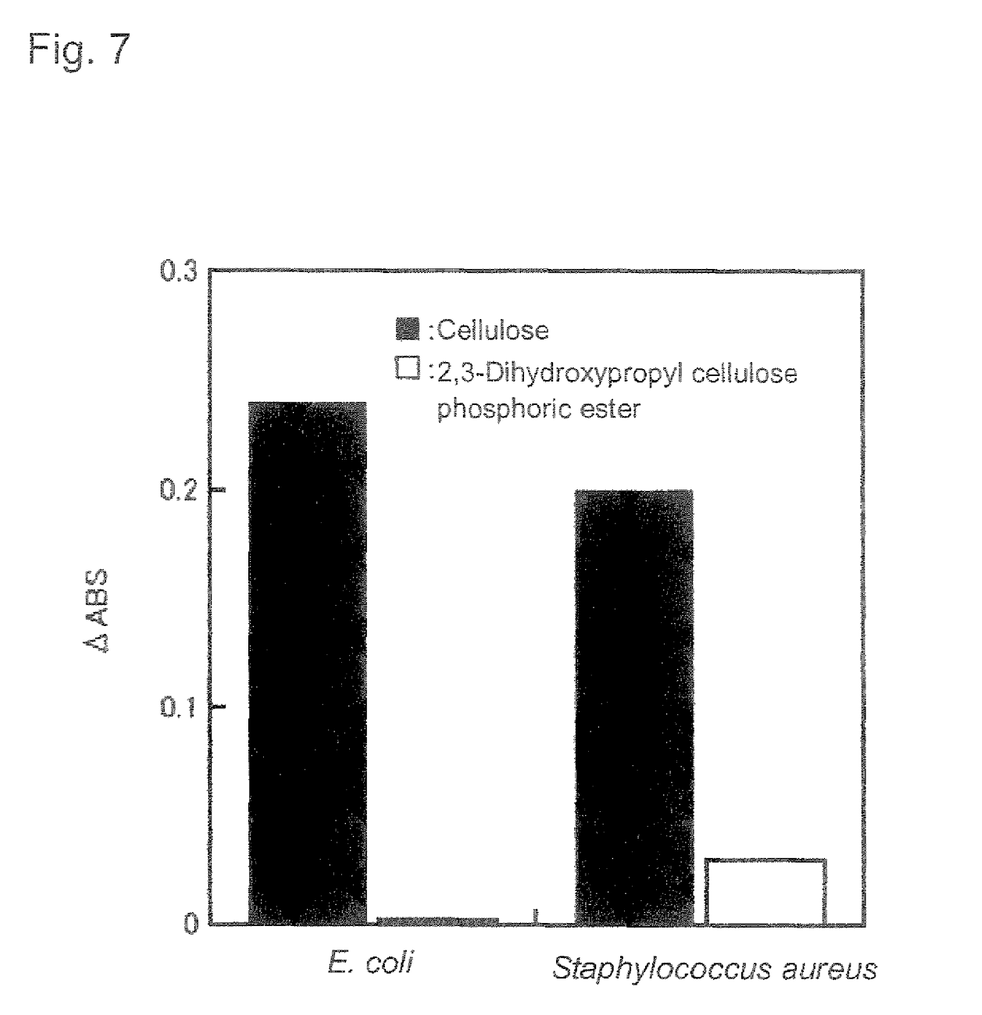
[FIG. 7] A graph showing anti-bacterial properties of a 2,3-dihydroxypropyl cellulose phosphoric ester.

On the basis of the above equation, change in absorbance due to the growth of E. coli or Staphylococcus aureus in the presence of α-cellulose or 2,3-dihydroxypropyl-α-cellulose phosphoric ester was calculated. The results are shown in FIG. 7. As is clear from FIG. 7, 2,3-dihydroxypropyl-α-cellulose phosphoric ester remarkably suppressed the growth of the bacteria.

The invention claimed is:

1. A phosphoric ester of 2,3-dihydroxypropyl cellulose or a phosphoric ester of 2,3-dihydroxypropyl cellulose that has undergone carbamidation wherein the phosphoric ester has a phosphorous content of 10.0 to 15.7 wt. % and a nitrogen content of 0 to 8.0 wt. %.

2. A method for producing the phosphoric ester of 2,3-dihydroxypropyl cellulose as described in claim 1,
comprising: reacting 2,3-dihydroxypropyl cellulose
with at least one of a phosphorus oxide, a phosphoryl halide, a phosphoric acid or a salt of the phosphoric acid, and
optionally partially carbamidating said cellulose.

3. The method as described in claim 2, wherein said reacting is carried out at a temperature of 0 to 150° C.

4. The method as described in 2, wherein 0.0007 to 0.4 moles of said at least one of a phosphorus oxide, a phosphoryl halide, a phosphoric acid or a salt of the phosphoric acid is present relative to 1 gram of said 2,3-dihydroxypropyl cellulose.

5. The method as described in claim 2, wherein 0.1 to 0.2 moles of said at least one of a phosphorus oxide, a phosphoryl halide, a phosphoric acid or a salt of the phosphoric acid is present relative to 1 gram of said 2,3-dihydroxypropyl cellulose.

6. The method as described in claim 2, wherein said at least one of a phosphorus oxide, a phosphoryl halide, a phosphoric acid or a salt of the phosphoric acid is at least one members selected from the group consisting of phosphorus trioxide; phosphorus tetroxide; phosphorus pentoxide; phosphorus oxychloride; phosphorus oxybromide; metaphosphoric acid; pyrophosphoric acid; orthophosphoric acid; triphosphoric acid; tetraphosphoric acid; diammonium hydrogenphosphate; ammonium dihydrogenphosphate; potassium dihydrogenphosphate; dipotassium hydrogenphosphate; sodium dihydrogenphosphate; and disodium hydrogenphosphate.

7. A metal adsorbent comprising the cellulose as described in claim 1.

8. A metal-adsorbing apparatus employing a metal adsorbent comprising the cellulose as described in claim 1.

9. The metal-adsorbing apparatus as described in claim 8, wherein the metal adsorbent is charged in a column.

10. The metal-adsorbing apparatus as described in claim 8, wherein the metal adsorbent is formed into a bag.

11. The metal-adsorbing apparatus as described in 8, wherein the metal adsorbent is formed into a tube or a fabric and is placed in a water reservoir tank.

12. A method for removing a metal impurity from a liquid, comprising:
contacting said liquid, which comprises at least one metal impurity, with the phosphoric ester of 2,3-dihydroxypropyl cellulose as described in claim 1 in the form of a powder, a knitted fabric, a woven fabric, a non-woven fabric, paper, thread, fiber, or cotton fabric.

13. A phosphoric ester of 3-(2,3-dihydroxypropoxy)-2-hydroxypropyl cellulose or a phosphoric ester of 3-(2,3-dihydroxypropoxy)-2-hydroxypropyl cellulose that has undergone carbamidation.

14. The cellulose as described in claim 13, wherein the phosphoric ester has a phosphorus content of 10.0 to 15.7 wt. % and a nitrogen content of 0 to 8.0 wt. %.

15. A method for producing the phosphoric ester of 3-(2,3-dihydroxypropoxy)-2-hydroxypropyl cellulose as described in claim 13,
comprising: reacting 3-(2,3-dihydroxypropoxy)-2-hydroxypropyl cellulose
with at least one of a phosphorus oxide, a phosphoryl halide, a phosphoric acid or a salt of the phosphoric acid, and
optionally partially carbamidating said cellulose.

16. The method as described in claim 15, wherein said reacting is carried out at a temperature of 0 to 150° C.

17. The method as described in claim 15, wherein 0.0007 to 0.4 moles of said at least one of a phosphorus oxide, a phosphoryl halide, a phosphoric acid or a salt of the phosphoric acid is present relative to 1 gram of said 3-(2,3-dihydroxypropoxy)-2-hydroxypropyl cellulose.

18. The method as described in claim 15, wherein 0.1 to 0.2 moles of said at least one of a phosphorus oxide, a phosphoryl halide, a phosphoric acid or a salt of the phosphoric acid is present relative to 1 gram of said 3-(2,3-dihydroxypropoxy)-2-hydroxypropyl cellulose.

19. The method as described in claim 15, wherein said at least one of a phosphorus oxide, a phosphoryl halide, a phosphoric acid or a salt of the phosphoric acid is at least one members selected from the group consisting of phosphorus trioxide; phosphorus tetroxide; phosphorus pentoxide; phosphorus oxychloride; phosphorus oxybromide; metaphosphoric acid; pyrophosphoric acid; orthophosphoric acid; triphosphoric acid; tetraphosphoric acid; diammonium hydrogenphosphate; ammonium dihydrogenphosphate; potassium dihydrogenphosphate; dipotassium hydrogenphosphate; sodium dihydrogenphosphate; and disodium hydrogenphosphate.

* * * * *